United States Patent [19]

Kadija et al.

[11] 4,247,345
[45] Jan. 27, 1981

[54] METHOD FOR JOINING SYNTHETIC MATERIALS

[75] Inventors: Igor V. Kadija; Kenneth E. Woodard, Jr., both of Cleveland, Tenn.; Paul M. Waxelbaum, West Haven, Conn.

[73] Assignee: Olin Corporation, New Haven, Conn.

[21] Appl. No.: 965,123

[22] Filed: Nov. 30, 1978

[51] Int. Cl.³ ............... B29C 27/08; B32B 7/08; H01M 2/14
[52] U.S. Cl. .................... 156/73.4; 156/93; 156/157; 156/217; 156/305; 156/304.3; 156/306.6; 156/309.6; 264/23; 429/139
[58] Field of Search ............... 156/93, 73.2, 73.4, 156/157, 217, 304, 305; 264/23; 429/139, 249

[56] References Cited

U.S. PATENT DOCUMENTS

| | | | |
|---|---|---|---|
| 1,856,218 | 5/1932 | Knowles | 204/295 |
| 3,134,703 | 5/1964 | Listner | 156/157 |
| 3,296,990 | 1/1967 | Simjian | 156/93 |
| 3,420,731 | 1/1969 | Kuhn | 156/93 |
| 3,546,054 | 12/1970 | Ross | 156/93 |
| 3,567,537 | 3/1971 | Marteny et al. | 156/93 X |

FOREIGN PATENT DOCUMENTS 873347 7/1961 United Kingdom ............ 156/93

*Primary Examiner*—Michael G. Wityshyn
*Attorney, Agent, or Firm*—Donald F. Clements; James B. Haglind

[57] ABSTRACT

Sections of synthetic materials, such as thermoplastic materials, suitable for use in electrolytic cells for the production of chlorine and sodium hydroxide, are joined together in a reinforced liquid-tight seam by a method which comprises positioning sections of material to be joined adjacent to but spaced apart from each other, to form a gap between the sections, placing a thermoplastic sealing composition in the gap, sewing the sections of synthetic material and the thermoplastic sealing composition together to form a seam, heating the seam to a temperature sufficient to melt the thermoplastic sealing composition without melting the synthetic material or the thread thereby allowing the melted thermoplastic sealing composition to flow to and fill perforations in the synthetic material adjacent to the thread. The seam is then cooled to solidify the thermoplastic sealing composition and to form a reinforced liquid-tight seam between the sections of synthetic material.

29 Claims, 5 Drawing Figures

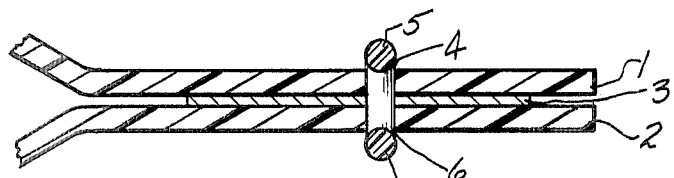
FIG-1
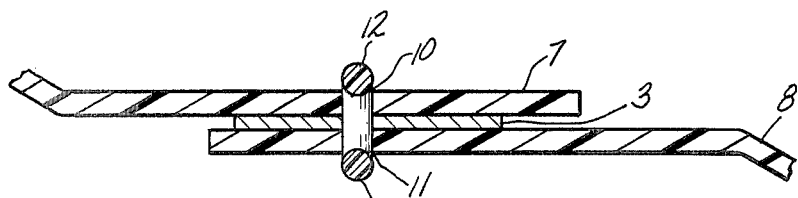
FIG-2
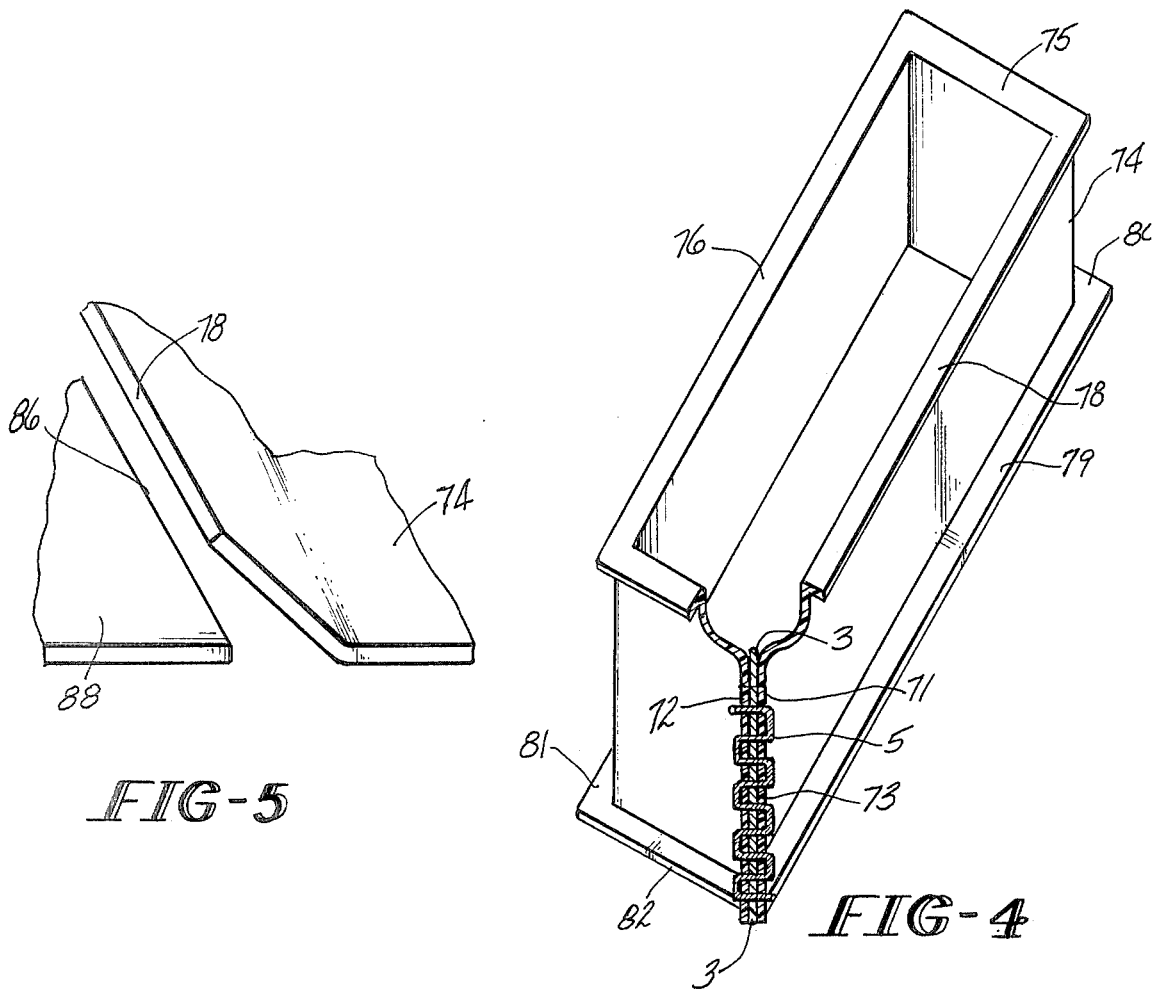
FIG-5
FIG-4

METHOD FOR JOINING SYNTHETIC MATERIALS

The present invention relates to a method for joining together at least two or more sections of synthetic materials in a reinforced liquidtight fashion. More particularly, the present invention relates to a method of joining synthetic materials for use in diaphragm-type electrolytic cells.

U.S. Pat. No. 1,856,218 issued to Albert Edgar Knowles on May 3, 1932, discloses a means of preparing sleeves from asbestos sheet used to enclose electrodes in an electrolytic decomposition cell. After forming a sleeve, the respective edges are stitched. The sleeve is secured to the cell structure by means of a metal strip in hems which are then pressed under appropriately positioned clips on the cell structure.

U.S. Pat. No. 3,296,990 issued to Luther G. Simjian on Jan. 10, 1967, discloses a process for reinforcing stitched material, for instance, machine sewn textiles. Synthetic textile material is seam stitched with thread in a conventional manner. Thereafter, ultrasonic energy is directed to the area adjacent to the thread penetration of the material. The applied energy causes the localized textile material to soften and flow, substantially surrounding and adhering to the thread.

U.S. Pat. No. 3,874,963 issued to Michael B. Barger on Apr. 1, 1975, discloses a process for bonding articles of thermoplastic material through the use of high frequency sonic energy. The process includes the use of independent energy directors inserted between the surfaces to be bonded along the path of the desired seam. Upon application of sonic energy, the surfaces to be bonded and the thermoplastic energy director are fused together along their entirety.

For electrochemical applications, where synthetic materials are joined together, high strength and liquid-tightness are required. It is highly desirable to join synthetic materials together in such a reinforced liquidtight fashion and separate and rejoin such synthetic materials.

Sewing has been employed to add strength in joining synthetic materials. However, in sewing, particularly in machine sewing, the needle and thread penetration of the synthetic material causes a perforation adjacent to the thread in the synthetic material which in the absence of strong securing fibers is responsible for ready tearing of the material particularly in the seam area.

Although methods which employ fusing of the synthetic materials together may obtain a liquidtight closure, damage may result to the synthetic materials joined by this method when the closure is separated and joined. Additionally, fusing synthetic materials may lack the required strength that sewing provides in certain applications.

The melting of the sections of synthetic material joined together to fill the gaps created by thread penetration of the synthetic material depletes the synthetic material around the seam area when separating and joining of the synthetic material is employed.

The method of the present invention employing a thermoplastic sealing composition in sewing sections of synthetic material together overcomes these and other disadvantages of the prior art and produces a reinforced liquidtight seam.

OBJECTS

It is a primary object of the present invention to provide a method of joining together synthetic materials in a reinforced liquidtight fashion.

It is a further object of the present invention to provide a method for effectively joining synthetic materials such as porous diaphragms produced from polyolefins for use in electrolytic cells.

It is a still further object of the present invention to provide a method for effectively joining synthetic materials such as ion exchange resins produced from one or more polymeric materials for use in electrolytic cells.

An additional object of the present invention is to provide a method for joining synthetic materials which can be employed at the location where the synthetic materials will be used.

Another object of the present invention is to provide a method for joining synthetic materials for use in partially or totally enclosing the electrodes in electrolytic cells.

These and other objects of the invention will become apparent from the following description and the appended claims.

BRIEF DESCRIPTION OF THE INVENTION

The foregoing objects of the invention are accomplished in a method for joining two sections of at least one sheet of synthetic material which comprises positioning the sections to be joined adjacent to but spaced apart from each other to form a gap between the sections, placing a thermoplastic sealing composition in the gap, sewing the sections and the thermoplastic sealing composition together with thread to form a seam which provides a preliminary joining of the sections and forms perforations in the synthetic material adjacent to the thread.

The seam is heated to a temperature sufficient to melt the thermoplastic sealing composition without melting the synthetic material or the thread, whereby the melted thermoplastic sealing composition flows to and fills the perforations. The seam is cooled to solidify the thermoplastic sealing composition thereby forming a reinforced liquidtight seam joining the sections of synthetic material.

In the accompanying drawings in which various possible embodiments of the invention are illustrated, FIG. 1 shows a cross sectional view of a seam prepared in accordance with the process of this invention joining two ends of a sheet of synthetic material by use of an overlapping seam wherein the sections are aligned in the same direction.

FIG. 2 shows a cross sectional view of a seam prepared in accordance with the process of this invention joining two sections of a synthetic material by an overlapping seam wherein the sections are aligned in opposite directions.

FIG. 4 is an isometric view of a sleeve of synthetic material in partial section joined by the process of this invention.

FIG. 5 is a partial sectional view of a joining of two sections of edges of sleeves prepared in accordance with the process of this invention.

DETAILED DESCRIPTION OF THE INVENTION

Figure 3:
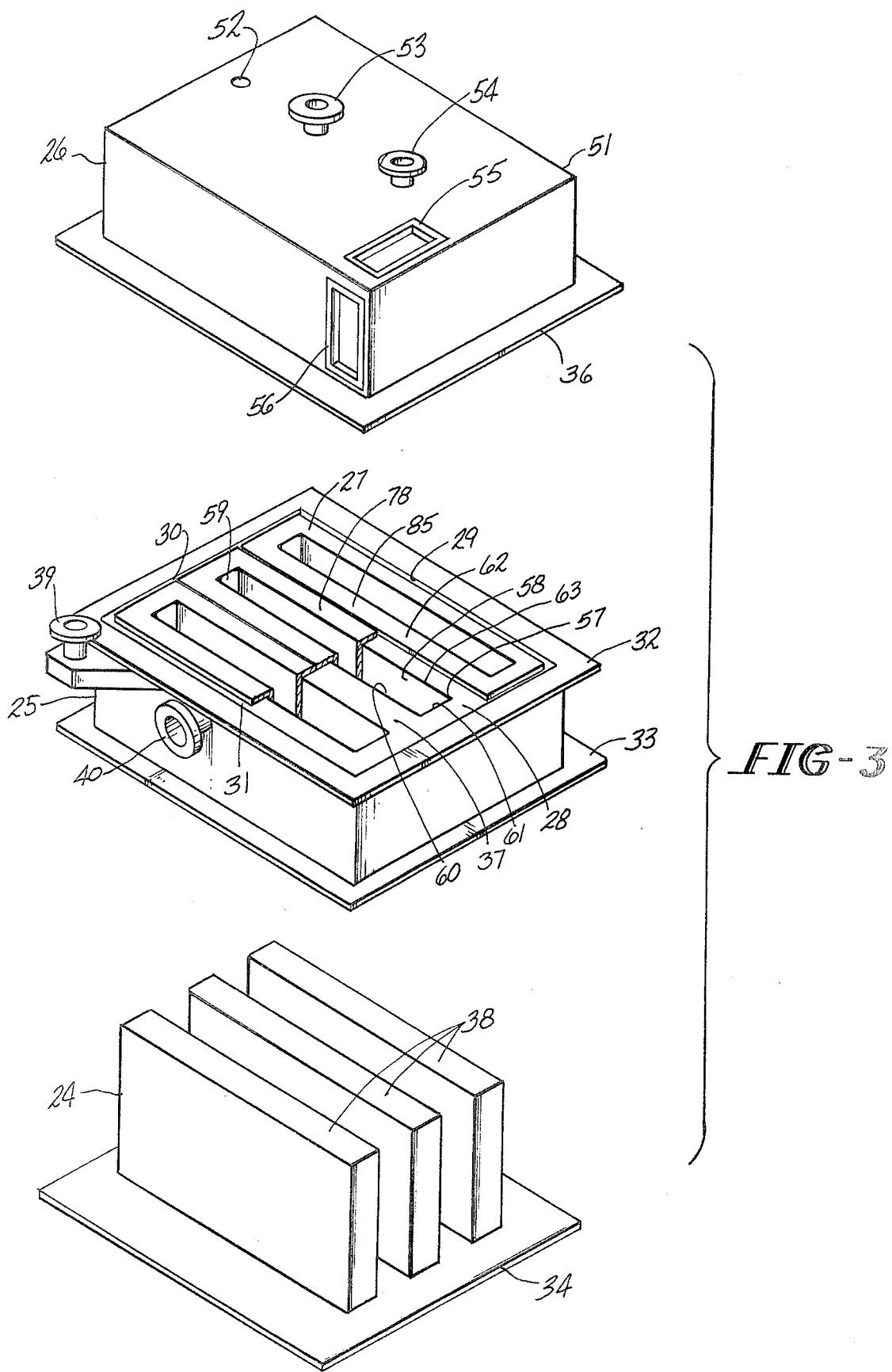
FIG. 3 is an expanded view of a typical electrolytic diaphragm cell showing an anode, a cathode enclosed by synthetic material in partial sectional view joined by the process of this invention, and a cover plate, which may be employed in the commercial production of chlorine.

Synthetic materials in sheet form which may be joined by the process of this invention include thermoplastic materials such as polyolefins which are polymers of olefins having in the range from about 2 to about 6 carbon atoms in the primary chain as well as their chloro- and fluoro- derivatives.

Examples include polyolefins selected from the group consisting of polyethylene, polypropylene, polybutylene, polypentylene, polyhexylene, polyvinylidene chloride, polytetrafluoroethylene, fluorinated ethylene-propylene (FEP), polychlorotrifluoroethylene, polyvinyl fluoride, polyvinylidene fluoride, and copolymers of ethylenechlorotrifluoroethylene.

Preferred polyolefins include the chloro- and fluoro- derivatives selected from the group consisting of polytetrafluoroethylene, fluorinated ethylenepropylene (FEP), polychlorotrifluoroethylene, polyvinyl fluoride, and polyvinylidene fluoride.

Also suitable are fabrics of polyaromatic compounds such as polyarylene compounds. Polyarylene compounds include polyphenylene, polynaphthylene and polyanthracene derivatives, for example, polyarylene sulfides such as polyphenylene sulfide or polynaphthylene sulfide. Polyarylene sulfides are well-known compounds whose preparation and properties are described in the *Encyclopedia of Polymer Science and Technology*, (Interscience Publishers), Vol. 10, pages 653–659. In addition to the parent compounds, derivatives having chloro-, fluoro- or alkyl substituents may be used such as poly(perfluorophenylene) sulfide and poly(methylphenylene) sulfide.

In addition, fabrics which are mixtures of fibers of polyolefins and polyarylene sulfides can be suitably used.

A preferred form of fabric is that of a felt fabric formed of polytetrafluoroethylene.

Sheets of synthetic materials, for example, ion exchange resins, such as those composed of fluorocarbon resins having cation exchange properties are also suitably joined by the method of the present invention.

Materials suitable for use as resins in the process of this invention include the sulfonic acid substituted perfluorocarbon polymers of the type described in U.S. Pat. No. 4,036,714, which issued on July 19, 1977 to Robert Spitzer; the primary amine substituted polymers described in U.S. Pat. No. 4,085,071, which issued on Apr. 18, 1978 to Paul Raphael Resnick et al; the polyamine substituted polymers of the type described in U.S. Pat. No. 4,030,988, which issued on June 21, 1977 to Walther Gustav Grot; and the carboxylic acid substituted polymers described in U.S. Pat. No. 4,065,366, which issued on Dec. 27, 1977 to Yoshio Oda et al. All of the teachings of these patents are incorporated herein in their entirety by reference.

With respect to the sulfonic acid substituted polymers of U.S. Pat. No. 4,036,714, these membranes are preferably prepared by copolymerizing a vinyl ether having the formula $FSO_2CF_2CF_2OCF(CF_3)CF_2OCF=CF_2$ and tetrafluoroethylene followed by converting the $-SO_2F$ group to either $-SO_3H$ or sulfonate (for example, alkali metal sulfonates) or both. The equivalent weight of the preferred copolymers range from 950 to 1350 where equivalent weight is defined as the average molecular weight per sulfonyl group.

With reference to the primary amine substituted polymers of U.S. Pat. No. 4,085,071, the basic sulfonyl fluoride polymer of the '714 patent above is first prepared and then reacted with a suitable primary amine wherein the pendant sulfonyl fluoride groups react to form N-monosubstituted sulfonamido groups or salts thereof. In preparing the polymer precursor, the preferred copolymers utilized in the film are fluoropolymers or polyfluorocarbons although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably 25 to 50 percent by weight of the latter. The sulfonyl groups are then converted to N-monosubstituted sulfonamido groups or salt thereof through the reaction of a primary amine.

Polymers similar to the above '071 patent are prepared as described in U.S. Pat. No. 4,030,988 wherein the backbone sulfonated fluoride polymers are reacted with a di- or polyamine, with heat treatment of the converted polymer to form diamino and polyamino substituents on the sulfonyl fluoride sites of the copolymer.

The carboxylic acid substituted polymers of U.S. Pat. No. 4,065,366 are prepared by reacting a fluorinated olefin with a comonomer having a carboxylic acid group or a functional group which can be converted to a carboxylic acid group. It is preferred to use a fluorinated copolymer having a molecular weight to give the volumetric melt flow rate of 100 millimeters per second at a temperature of 250° C. to 300° C. Preferably, the membrane is compared by copolymerizing tetrafluoroethylene with $CF_2=CFO(CF_2)_3COOCH_3$.

Suitable resins also include those polymers described above which have been substituted with phosphonic acid and amides.

In employing the process of the present invention, two sections of at least one sheet of synthetic material are joined together by positioning the sections to be joined adjacent to but spaced apart from each other to form a gap between the sections.

Two sections of a same or another sheet of synthetic material and sections of synthetic material which are ends of a same or another sheet may be joined in several seam form embodiments hereafter described.

In a first seam form embodiment, FIG. 1 shows a cross sectional view of an overlap seam. Section 1 an end of one sheet of synthetic material is brought adjacent to and aligned in the same direction as section 2, an end of a same or another section of synthetic material, but spaced apart a sufficient distance to form a gap.

The distance of the gap in the first seam form embodiment is in the range from about 0.001 to about 0.50, and preferably in the range from about 0.005 to about 0.40 centimeter.

A thermoplastic sealing composition 3 is placed in the gap between section 1 and section 2.

Section 1, section 2, and thermoplastic sealing composition 3 are sewn together with polytetrafluoroethylene thread to form a seam.

Perforations are formed adjacent to the thread at the point where the thread is stitched through the sections of synthetic material in a step described more fully hereafter.

For example, in FIG. 1, perforation 4 is formed adjacent to thread 5 as thread 5 penetrates section 1 of synthetic material. Similarly, perforation 6 is formed adjacent to thread 5 as thread 5 emerges from section 2 of the synthetic material.

In a second seam form embodiment, FIG. 2 shows a cross sectional view of an overlap seam. Section 7 is an end of a sheet of synthetic material is brought adjacent to and aligned in the opposite direction as section 8 an end of the same section or a different section of synthetic material but spaced apart a sufficient distance to form a gap.

A thermoplastic sealing composition 3 is placed in the gap between section 7 and section 8.

Section 7, section 8, and thermoplastic sealing composition 3 are sewn together with polytetrafluoroethylene thread to form a seam.

In the second seam form embodiment, perforations 10 and 11 are formed adjacent to the thread 12 penetration of section 7 and section 8.

The distance of the gap employed in the second seam embodiment is the same as the distance of the gap employed in the first seam embodiment.

Sections which are ends of a plurality of sheets of synthetic material may be joined by the process of this invention in a manner similar to those described above.

Suitable thermoplastic sealing compositions for placing in the gaps include thermoplastic resins which have a melting temperature below the temperature at which the synthetic materials melt, for example, in the range from about 50 to about 400, preferably from about 100 to about 300, and more preferably from about 150° to about 250° C.

Typical examples of these thermoplastic sealing compositions include halogenated polyolefins selected from a group consisting of polyvinylidene chloride, polytetrafluoroethylene, fluorinated ethylene-propylene (FEP), polychlorotrifluoroethylene, polyvinyl fluoride, polyvinylidene fluoride, polymerized perfluoroalkoxy resin having the formula $CF_2CF_2CFO(C_nF_{2n+1})CF_2CF_2$ where n is a positive integer in the range from 1 to about 10, copolymers of ethylene-chlorotrifluoroethylene and mixtures thereof, where the halogens are chlorine or fluorine.

The thermoplastic sealing composition may be applied as a film or as a liquid in the form of a suspension, paste, dispersion, paint, and the like. In the embodiment where the thermoplastic sealing composition is applied as a film, the film is a fluorinated ethylene-propylene (FEP) film.

The thickness of the thermoplastic sealing composition is in the range from about 0.001 to about 0.50 and preferably in the range from about 0.005 to about 0.40 centimeter.

The sections of synthetic material and the film of thermoplastic sealing composition are sewn together as described more fully below with thread by hand or by a conventional sewing machine to form a seam which provides a preliminary joining of the sections and forms perforations in the synthetic material adjacent to the thread as previously described.

Although any convenient thread size may be employed, a particular thread which may be employed is a polytetrafluoroethylene thread size 302.

In the embodiments where the thermoplastic sealing composition is employed as a liquid form of a solution, dispersion, paste or paint, it is preferred that the thermoplastic sealing composition be applied to the surfaces of the sections of synthetic material after stitching of the sections is completed. A coating of the thermoplastic sealing composition is applied to all portions of the sections of synthetic materials joined together by stitching. The coated sections are preferably allowed to dry before being brought together.

In a preferred embodiment of liquid application, a paste suspension of a fluorinated ethylene-propylene (FEP) containing in the range from about 40 to about 60 percent by weight solids is applied liberally to the immediate area of the synthetic materials, for example, ion exchange resin sections joined by stitching as described above.

In joining the sections of synthetic material and the thermoplastic sealing composition, different stitches may be employed, such as bar, overlock or continuous stitch.

When using a bar stitch, for example, on felts, the number of stitches employed is in the range from about 1 to about 6, but it is preferable to employ about 2 to about 5 stitches per centimeter of felt.

After the sections of synthetic material and the thermoplastic sealing composition are stitched together, the seam is heated to a temperature sufficient to melt the thermoplastic sealing composition without melting the synthetic material or the thread.

The sections of synthetic material which contact other sections of synthetic material in the seam are sealed by the application of ultrasonic energy using any suitable ultrasonic device which is capable of generating sufficient heat to melt the thermoplastic sealing composition and form a bond between the sections of the synthetic materials.

For example, ultrasonic welding devices employing power in the range from about 50 to about 600 watts, preferably in the range from about 100 to about 400 watts, can be used in the method of the present invention. These devices generate ultrasonic vibrations in the range from about 20,000 to about 50,000 hertz.

The melted thermoplastic sealing composition flows to and fills the perforations in the sections of synthetic material adjacent to the thread producing a reinforced liquidtight seam after cooling to solidify the thermoplastic sealing composition.

The power level of the ultrasonic energy must be high enough to cause localized flow of the thermoplastic sealing composition, but must be low energy so as not to melt the surrounding sections of synthetic material.

Sealing times in the range from about 1 to about 10 seconds are quite satisfactory, however, longer or shorter sealing times may be used, if desired.

During the sealing and cooling stages, pressures in the range from about 10 to about 200 pounds per square inch are suitably employed, but higher or lower pressures may be employed, if desired.

After sealing, the seam and thermoplastic sealing composition are cooled to solidify the thermoplastic sealing composition.

Cooling periods greater than the time required for sealing are preferred, for example, periods which are multiples of the sealing time in the range of 3 to about 5 times are employed.

The present invention may be employed in joining together many different synthetic materials. In the chemical process industries applications such as chloralkali electrolysis are of primary importance. The invention is hereafter described more particularly with respect to such chlor-alkali cell operation whereby an electrode, for example, the electrolytic surface of a cathode is enclosed by synthetic material joined by the process of this invention. However, such description is not to be understood as limiting the claims and usefulness of the present invention.

Chlorine widely used in the production of pulp and paper, and in sanitation for sewage treatment and purification of water is produced almost entirely by the electrolysis of fused or aqueous solutions of alkali metal chlorides. Production is carried out in various types of electrolytic cells, the most widely employed in a diaphragm type cell.

FIG. 3 is an expanded view of a typical diaphragm cell showing an anode assembly 24, a cutaway view of a cathode assembly 25 partially enclosed by synthetic material joined by the process of this invention, and a cover plate assembly 26.

In a typical assembled cell, the cathode assembly 25 enclosed by synthetic material 27 joined by the process of this invention is positioned over the anode base plate 34. The cover plate assembly 26 in turn is placed over the cathode assembly 25.

In FIG. 3, the cathode assembly 25 of a typical electrolytic cell is comprised of a conductive metal enclosure having sidewalls 28, 29, 30, 31 forming preferably a rectangular shaped structure of a suitable size corresponding to the particular cell and capacity thereof with which cell it is to be used. Surrounding the enclosure at the top of sidewalls 28, 29, 30, 31 is cathode assembly top flange 32.

Flange 33 is the bottom flange of cathode assembly 25. Flanges are utilized to more conveniently seal the cathode assembly 25 in a liquidtight relationship in the assembled electrolytic cell. Cathode assembly bottom flange 33 rests on gasket material (not shown) placed between the cathode assembly bottom flange 33 and the anode assembly base plate 34. Flange 36 of cover plate assembly 26 rests on gasket material (not shown) placed between the cover plate assembly flange 36 and the cathode assembly top flange 32.

A typical cathode assembly 25 has a plurality of individual metal cathodes 37 traversing the width of cathode assembly 25. The metal cathodes 37 are substantially rectangular in shape; however, any convenient shape may be employed.

In a typical electrolytic cell, the number of such metal cathodes 37 may vary widely, depending on the particular cell size, but commonly ranges from about 2 to about 100 or more.

The metal cathodes 37 are preferably constructed of metal screen mesh, perforated metal plating, or foraminous structures.

Cathode assembly 25 has a process connection 39 for removal of hydrogen gas produced during the electrolysis of sodium chloride brine and a thermowell 40 for employing a temperature measuring device.

A level control system (not shown) is also located on cathode assembly 25.

Anode assembly 24 is comprised of a flat rectangular base plate 34 of a suitable size corresponding to the particular cell and capacity thereof with which the cell is to be used. Connected therewith is a plurality of individual metal anodes 38 traversing anode base plate 34. The metal anodes 38 are substantially rectangular in shape, however, any convenient shape may be employed. The dimensions of metal anodes 38 are suitably selected to intermesh with metal cathodes 37 in an assembled cell.

Metal anodes 38 of anode assembly 24 intermesh upwards with metal cathodes 37 projecting downward. The clearance between the metal anodes 38 and metal cathodes 37 normally is in the range from about 0.30 to about 1.0 centimeter and permits employing a suitable synthetic material to be placed therebetween.

Commonly, the gasket material (not shown) is joined in a process hereafter described with the synthetic material placed between the metal cathodes 37 and metal anodes 38 to form a continuous material covering the entire electrolytic surface of cathode assembly 25.

Cover plate assembly 26 is comprised of a housing 51, having a plurality of openings. Opening 52 is for a feed line connection for feeding, for example, sodium chloride brine to the cell; opening 53 is a process outlet for chlorine gas, produced during the electrolysis of sodium chloride brine; opening 54 is another process connection; opening 55 is a safety pressure relief device connection; and side opening 56 is a view port of the cell.

In carrying out the method of the present invention, metal cathode 37 of cathode assembly 25, as shown in FIG. 3, is enclosed by employing synthetic material, for example, a felt fabric in the form of a fabric sheet.

To illustrate one embodiment of the process of this invention, in enclosing metal cathode 37, of FIG. 3, beginning at point 57, for example, where metal cathode 37 merges normally into sidewall 28, one end of a fabric sheet 62 is form fitted adjacent to the interior metal cathode surfaces 58, 59, 60, 61. The fabric sheet is extended past the beginning point 57 and is overlapped for a short distance, from point 57 to point 63.

Vertically, for the surfaces previously described, the fabric sheet 62 is extended the depth of the cathode assembly 25.

The distance the fabric sheet 62 overlaps from point 57 to point 63 is in the range from about 1.0 to about 6.0 centimeters and preferably in the range from about 1.5 to about 5.0 centimeters.

For certain electrode configurations, it is desirable to extend the fabric sheet 62 beyond the interior metal cathode surfaces 58, 59, 60, 61, to form edging, for example, onto metal cathode 37 and sidewalls 28, 29, 30, 31 so that gasket material (not shown) may be joined therewith to enclose the entire electrolytic cathode assembly 25 surface, if desired.

The edging may range in length from about 1.5 to about 8.0 centimeters and preferably from about 2.5 to about 6.0 centimeters.

A pattern may be employed instead of forming the fabric sheet 62 on the cathode assembly 25 of the cell as described above.

With the fabric sheet 62 form fitted to the cathode surface and the edging distances selected, the fabric sheet 62 is marked by conventional means, for example, tailor's chalk. It is usually necessary to remove the fabric sheet 62 from the cathode surface for cutting. The fabric sheet 62 is cut by conventional means, for example, a scissors, to the desired form.

In FIG. 4, section 71 an end of fabric sheet 62, is brought adjacent to and aligned in the same direction as section 72 an end of fabric sheet 62 but spaced apart a sufficient distance to form a gap.

The distance of the gap is in the range from about 0.010 to about 0.025 centimeter.

A thermoplastic sealing composition 3 is placed in the gap between section 71 and section 72.

Section 71, section 72, and thermoplastic sealing composition 3 are sewn together with a conventional sewing machine employing a polytetrafluoroethylene thread 5 to form an overlap seam 73.

Seam 73 is sealed by applying ultrasonic energy at a temperature of about 200° C. for a time period in the range from about 1.0 to about 2.5 seconds.

Seam 73 is cooled to solidify the thermoplastic sealing composition 3.

During sealing and cooling stages, pressures in the range of from about 10 to about 200 pounds per square inch are suitably employed and preferably a cooling period of about 3 to about 50 seconds is employed.

With the seam 73 completed, the fabric sheet forms the shape of sleeve 74.

Edging 75, 76, 77, and 78 is located on the top of sleeve 74 and extends from the interior metal cathode surface onto metal cathode 37 and sidewalls 28, 29, 30, 31. Similarly, edging 79, 80, 81, 82 is located on bottom of sleeve 74.

Sleeve 74 is inserted on the cathode assembly 25 with edging 75, 76, 77, 78 extending onto the metal cathode 37 and sidewalls 28, 29, 30, 31.

Sleeve 74 is positioned adjacent to the cathode interior surfaces 58, 59, 60, 61. Typically, seam 74 is positioned in a corner of cathode assembly 25, for example, at point 57, at the intersection of a sidewall 28 and a metal cathode 37.

As an alternate to this method of enclosing an electrode surface, individual ends and sides may be form fitted to the contour of the cathode. However, it is desirable from the standpoint of strength and liquidtightness to minimize the number of seams employed in enclosing any surface particularly an electrode surface.

Sleeves for adjacent metal cathodes 37 are joined, if desired.

In FIG. 5, edging 78 of sleeve 74 of synthetic material 87 is overlapped onto edging 86 of an adjacent sleeve of synthetic material 88. Edging 78 and edging 86 are pressed together and joined by heat sealing or any other convenient method.

If desired, suitable gasket material (not shown) as previously described is form fitted and cut to any remaining cathode assembly 25 surface area and joined with edging 75, 76, 77, 78, 79, 80, 81, 82 by heat sealing or any other convenient method to cover any remaining top, bottom and side electrode surface.

Sleeve 74 may be joined with gasket material (not shown) but previously described.

Joining of the edging 75, 76, 77, 78 of the sleeve 74 and the gasket material (not shown) on the top side of cathode assembly 25 may be accomplished before the sleeve 74 is inserted onto the cathode assembly 25. Edging 79, 80, 81, 82 of sleeve 74 and gasket material (not shown) for the bottom side of cathode assembly 25 is joined thereafter.

Other variations in the form of the electrode and in the assembled reaction thereof may be made within the scope of the claims appended to this specification. For certain variations in the form of the electrode flaring and tapering of the fabric sheet may be desirable to form fit the fabric sheet to the electrode.

Where the fabric sheet employed is a felt fabric, the impregnation of the felt fabric with a silica-containing material may be carried out prior to or after the preparation of the separator has taken place.

The following examples are presented to define the invention more fully without any intention of being limited thereby. All parts and percentages are by weight unless indicated otherwise.

EXAMPLE 1

A metal cathode of the form shown in FIG. 4 was enclosed by sections of a polytetrafluoroethylene felt (Armalon ® 7550) having about 6.65 denier fibers, needled and loomed and having a thickness of about 0.35 centimeter. The ends of the sections of tetrafluoroethylene felt were overlapped for a distance of about 4.0 centimeters.

The two sections of the same felt were aligned in the same direction and spaced about 0.015 centimeter apart.

A thermoplastic sealing composition of a fluorinated ethylene-propylene (FEP) film (Livingston Coatings, Inc., activated film 100 C-20) about 0.015 centimeter thick and having a molecular weight of about 250,000 was placed between the sections of the felt to be joined.

The sections of felt and the FEP film were hand-stitched together with a polytetrafluoroethylene thread size 302 to form an overlap seam. About three stictches per centimeter were employed.

After stitching, joining of the felt sections was completed by manually applying an ultrasonic welding gun (Mastersonic, Inc., Ultrasonic Handgun HG-100) along the sections of the felt adjacent to the thread to provide a temperature of about 200° C. which was sufficient to melt the FEP film at a sealing time of about 2 seconds.

The seam was cooled for about 50 seconds thereafter and a highly satisfactory reinforced liquidtight seam was obtained.

EXAMPLE 2

Two sections of a perfluorosulfonic acid ion exchange resin material (i.e., duPont de Nemours' Nafion ® 295 ion exchange resin) were overlapped about 2.50 centimeters for a distance of about 25 centimeters.

A portion of an FEP film as employed in Example 1 was placed between the two sections of FEP film to be joined. The two sections were aligned and positioned as in Example 1. The FEP film employed was about 0.01 centimeter thick.

The sections of ion exchange resin and the FEP film were stitched together in an overlap seam employing a conventional sewing machine. A polytetrafluoroethylene thread size 302 was employed at about 2 stitches per centimeter.

Following stitching, an ultrasonic gun was applied (as in Example 1) along the portions of FEP film adjacent to the thread, to melt the FEP film.

Thereafter the seam was cooled for about 50 seconds and then introduced into an aqueous solution of about 25 percent sodium hydroxide at a temperature of about 25° C. and leak checked for about 24 hours.

No leakage was detected when the seam was subjected to a head pressure of about 13 centimeters of sodium hydroxide solution.

An examination of the seam showed no defects in the seam.

EXAMPLE 3

In Example 3, the same procedure was employed as in Example 2, except that a paste suspension of fluorinated ethylene-propylene (FEP) containing about 50 percent by weight solids instead of an FEP film was liberally applied to the immediate area of the two sections of ion exchange resin joined by stitching in an overlap seam. The area was then allowed to dry for about one hour.

Thereafter, the two sections were sealed with the ultrasonic handgun as employed in Example 1, at a temperature of about 200° C., while employing a pressure to the sections to be sealed of about 100 pounds per square inch. The pressure was maintained on the sealed sections of ion exchange resin while cooling took place.

No leakage was detected when the seam was subjected to the same sodium hydroxide solution as in Example 2 under similar conditions.

EXAMPLE 4

In Example 4, the same procedure was employed as in Example 1, except that a thermoplastic sealing composition of a polytetrafluoroethylene film about 10 mils thick and having a melting temperature in the range from about 350° to about 410° C. was placed between the ends of the felt to be joined.

The sealing time was about 3.5 seconds. The seam was cooled for about 50 seconds thereafter and a highly satisfactory reinforced liquid tight seam was obtained.

What is claimed is:

1. A process for joining at least two sections of at least one sheet of synthetic material selected from the group consisting of sulfonic acid substituted perfluorocarbon polymers, amine substituted perfluorocarbon polymers, carboxylic acid substituted polymers, polytetrafluoroethylene felts, fluorinated ethylene-propylene (FEP), polychlorotrifluoroethylene felts, and polyarylene compounds, which comprises:
   a. positioning said sections to be joined adjacent to but spaced apart from each other to form a gap between said sections,
   b. placing a thermoplastic sealing composition in said gap, wherein said thermoplastic sealing composition is selected from the group consisting of fluorinated ethylene-propylene (FEP), perfluoro-alkoxy resins, and polytetrafluoroethylene,
   c. sewing said sections and said thermoplastic sealing composition together with thread to form a seam which provides a preliminary joining of said sections and to form perforations in said synthetic material adjacent to said threads,
   d. heating said seam by application of ultrasonic energy having a frequency in the range from about 20,000 hertz to about 50,000 hertz to a temperature sufficient to melt said thermoplastic sealing composition without melting said synthetic material or said thread,
   e. whereby said melted thermoplastic sealing composition flows to and fills said perforations, and
   f. cooling said seam to solidify said thermoplastic sealing composition, whereby a liquidtight reinforced seam suitable for use in a chlorine environment is formed to join said sections of synthetic material.

2. The process of claim 1 wherein said sections are ends of a plurality of sheets of synthetic material.

3. The process of claim 1 wherein said sections are ends of the same sheet of synthetic material.

4. The process of claims 1, 2 or 3 wherein said seam is an overlap seam of two sections of synthetic material.

5. The process of claims 1, 2 or 3 wherein external pressure is applied during heating and cooling of said thermoplastic sealing composition.

6. The process of claim 5 wherein said external pressure is in the range from about 10 to about 200 pounds per square inch.

7. The process of claim 3 wherein said sheet of synthetic material is formed into a desired shape, said sheet is cut to remove excess synthetic material while leaving sufficient ends to form an overlap seam.

8. The process of claim 7 wherein said shape is an electrode of a diaphragm cell.

9. The process of claim 8 wherein said electrode is an anode.

10. The process of claim 8 wherein said electrode is a cathode.

11. The process of claim 1 wherein said thermoplastic sealing composition is a fluorinated ethylene-propylene (FEP) film.

12. The process of claim 11 wherein the thickness of said thermoplastic sealing composition is in the range from about 0.001 to about 0.50 centimeter.

13. The process of claim 11 wherein the thickness of said thermoplastic sealing composition is in the range from about 0.005 to about 0.40 centimeter.

14. The process of claim 13 wherein said seam is heated to a temperature in the range from about 50° to about 400° C.

15. The process of claims 1, 2 or 3 wherein said thermoplastic sealing composition is applied after stitching is complete.

16. The process of claim 15 wherein said thermoplastic sealing composition is a paste suspension of a fluorinated ethylene-propylene (FEP) containing in the range from about 40 to about 60 percent by weight solids.

17. The process of claim 16 wherein said carboxylic acid substituted polymer is prepared by reacting a fluorinated olefin with a comonomer having a carboxylic acid group or a functional group which can be converted to a carboxylic acid group.

18. The process of claims 2 or 3 wherein said seam is stitched employing a bar stitch.

19. The process of claims 2 or 3 wherein said seam is joined by employing a continuous stitch.

20. The process of claims 2 or 3 wherein said seam is joined by employing an overlock stitch.

21. The process of claim 1 wherein said thread is a polytetrafluoroethylene thread.

22. The process of claim 21 wherein the number of stitches employed is in the range from about 1 to about 6 per centimeter.

23. The process of claim 21 wherein the number of stitches employed is in the range from about 2 to about 5 per centimeter.

24. The process of claim 1 wherein said sulfonic acid substituted perfluorocarbon polymer is a copolymer of a perfluoroolefin with a sulfonated perfluorovinyl ether.

25. The process of claim 1 wherein said amine substituted perfluorocarbon polymer is a primary amine substituted copolymer of a perfluoroolefin with a sulfonated perfluorovinyl ether.

26. The process of claim 1 wherein said amine substituted perfluorocarbon polymer is a poly or di-amine substituted copolymer of a perfluoroolefin with a sulfonated perfluorovinyl ether.

27. The process of claim 1, wherein said perfluoroalkoxy resin has a formula $CF_2CF_2CFO(C_nF_{2n+1})CF_2CF_2$ where n is a positive integer in the range from 1 to about 10.

28. The process of claim 1, wherein said sulfonic acid substituted perfluorocarbon polymer is prepared by copolymerizing a vinyl ether having the formula $FSO_2CF_2CF_2OCF(CF_3)CF_2OCF=CF_2$ and tetrafluoroethylene followed by converting the $—SO_2F$ to either $—SO_3H$ or alkali metal sulfonate.

29. The process of claim 1, wherein said polyarylene compound comprises polyarylene sulfide.

* * * * *